United States Patent [19]  [11] 4,005,441
Shimomura  [45] Jan. 25, 1977

[54] PHOTOMETRIC DEVICE OF THROUGH THE LENS TYPE EXPOSURE METER IN A SINGLE-LENS REFLEX CAMERA

[75] Inventor: Jun Shimomura, Tokyo, Japan
[73] Assignee: Nippon Kogaku K.K., Tokyo, Japan
[22] Filed: July 22, 1975
[21] Appl. No.: 598,040
[30] Foreign Application Priority Data
July 31, 1974 Japan .............. 49-90603[U]
[52] U.S. Cl. .................. 354/23 R; 354/152
[51] Int. Cl.² ........................... G03B 17/00
[58] Field of Search ........... 354/23, 45, 56, 59, 354/224, 225, 152, 154, 155, 156; 352/141

[56] References Cited
UNITED STATES PATENTS

| | | | |
|---|---|---|---|
| 3,476,028 | 11/1969 | Namba et al. | 354/56 |
| 3,672,284 | 6/1972 | Schwarz | 354/23 |
| 3,699,864 | 10/1972 | Shimomura | 354/23 |
| 3,842,424 | 10/1974 | Tsunikawa et al. | 354/152 |

FOREIGN PATENTS OR APPLICATIONS

| | | | |
|---|---|---|---|
| 1,465,439 | 12/1966 | France | 354/152 |
| 1,318,226 | 1/1963 | France | 354/152 |
| 1,527,417 | 4/1968 | France | 354/152 |
| 1,277,664 | 9/1968 | Germany | 354/154 |

*Primary Examiner*—Joseph F. Peters, Jr.
*Attorney, Agent, or Firm*—Fitzpatrick, Cella, Harper & Scinto

[57] ABSTRACT

A photometric device for a through the lens type exposure meter in a single lens reflex camera. The reflecting mirror provides a region transmitting a part of the light rays incident thereon. The light passing through said region is reflected by a reflecting-concentrating member and received by a light receiving member, the surface of which is adjacent to the film and disposed on or in the vicinity of the optical axis of the phototaking lens. The reflecting-concentrating member is disposed to substantially cover the photometry range of the film and the optical axis of the reflecting-concentrating member is substantially coincident with the optical axis of the phototaking lens.

6 Claims, 6 Drawing Figures

PHOTOMETRIC DEVICE OF THROUGH THE LENS TYPE EXPOSURE METER IN A SINGLE-LENS REFLEX CAMERA

BACKGROUND OF THE INVENTION

1. Field of the Invention

This invention relates to photometric devices of the TTL (through the lens) type, and more particularly, to an exposure meter in a single-lens reflex camera which measures the light rays passing through the reflex mirror of the camera.

2. Description of the Prior Art

A photometric device of the so-called TTL type exposure meter which measures light rays passing through the camera lens of a single-lens reflex camera wherein the light receiving element is arranged behind the reflex mirror to receive the light rays passing through the reflex mirror which is designed to partially pass the light rays coming from the camera lens and to reflex most of the light rays to the view finder optical system, has been known (Japanese Laid Open Specification No. 67623/1974). The camera provided with such a photometric device, however, has several disadvantages. Thus, as the light receiving element of the photometric device is arranged out of the path of the light rays passing through the reflex mirror, and the light transmitted to the reflex mirror is reflected to the light receiving element by a further reflecting member placed in front of the focal plane shutter, the reflecting member should necessarily be obliquely disposed with respect to the optical axis of the photo-taking lens. The reflecting member of the prior art is required to be large enough, especially in cameras equipped with the so-called center-weighted measurement system, to cover a wide photometric range; and, moreover, it becomes larger because the reflecting member is angularly disposed with respect to the optical axis. Therefore, the increased mass or inertial moment of the enlarged reflecting member may cause undesired movement or vibration when the reflex member is withdrawn from the photo-taking light path at the time of photographing.

Further, the angular disposition of the reflecting member may cause another difficulty in that a high degree of tolerance is required in the disposition of geometry of the reflecting member to maintain sufficient photometric accuracy, since a small difference in the disposition, or geometric error of the reflecting member greatly affects the advancing direction of the light reflected by the reflecting member towards the light receiving element.

SUMMARY OF THE INVENTION

Accordingly, I have conceived a device of the class described wherein I combine a photometric device for an exposure meter of simple construction with a single-lens reflex camera, wherein the above disadvantages have been removed and the photometric accuracy thereof cannot be adversely affected by a small change in the location or position of the reflecting member.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purpose of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purpose of illustration and description, and are shown in the accompanying drawings, forming a part of the specification wherein.

DESCRIPTION OF THE PREFERRED EMBODIMENTS

Figure 1:
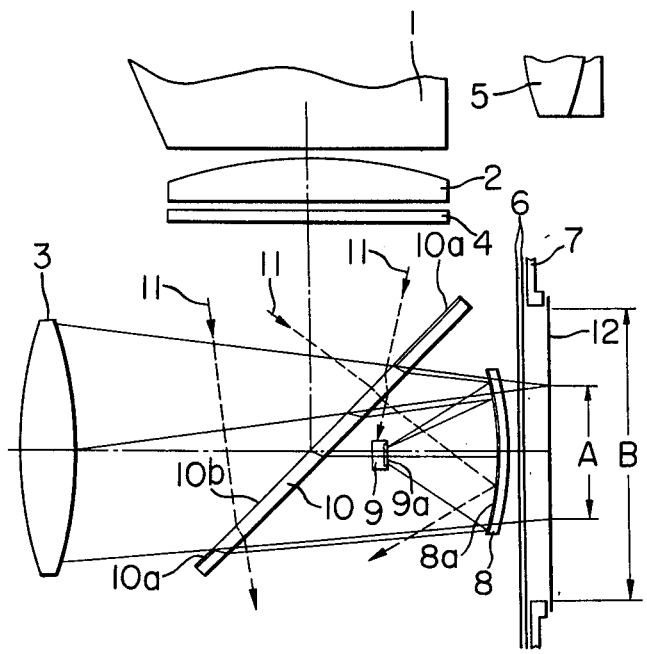
FIG. 1 is a diagrammatic illustration of the first embodiment of the present invention.

Referring first to FIG. 1 which illustrates the first embodiment of the invention, the light rays from an object passing through a camera lens 3 are reflected at a reflex mirror 10 to enter the view finder optical system composed of a focusing plate 4, a condenser lens 2, a pentaprism 1, partially shown here, and an eyepiece lens 5. A part 10a of the reflex mirror 10 reflects all the incident rays thereto and the remaining part 10b thereof is semi-transparent or has a plurality of transmitting holes to reflect a part of the light rays, which pass through the camera lens 3, to the view finder optical system and to transmit or pass the remaining part of said rays. There is a concave mirror 8 positioned between a focal plane shutter 6, which is directly in front of the film 12, and the reflex mirror 10 to cover the central photometric range A in the central part of the photo-taking picture B limited by a picture frame 7. The concave mirror 8 is disposed so that the optical axis thereof is coincident with that of the camera lens 3.

Accordingly, the light rays to enter the central photometric range A through the light passing part 10b of the reflex mirror 10 is reflected at the concave mirror 8a to enter a light receiving element 9 of the exposure meter disposed on the optical axis of the camera lens or in the neighborhood thereof. The light receiving element 9 photoelectrically converts intensity of light incident thereon into electrical signal. The surface 9a of the light receiving element 9 is substantially conjugate with respect to the film surface 12.

Before photographing, the reflecting mirror 10 is moved by conventional means from the photo-taking light path to a position 10' in which the mirror 10 is out of the light path, and the concave mirror 8 and the light receiving element 9 are also moved from the photo-taking light path in response to the movement of the reflecting mirror 10 immediately before photographing.

As the light receiving element 9 is placed in the path of the light rays passing through the reflecting mirror, it shields a part of the trasmitted light so that although the luminous flux reaching the surface of the light receiving element 9 is partially cut near the optical axis, if the photometric range A and the size of the concave mirror 8 are large enough, compared with the size of the light receiving element 9, the effect of the cut on the photometric accuracy is minimal and can be ignored. When a silicon photocell 1 to 2 mm. square packed by transparent resin is employed as the light receiving element 9, the abovementioned conditions will be satisfied. As the surface 9a of the light receiving element 9 receives the light rays condensed by the concave mirror 8, the illumination intensity thereof becomes high. Therefore, the fact that silicon photo-cells have a small absolute sensitivity and show poor linearity at a very low illumination intensity does not have an unfavourable effect on the photometric accuracy.

Accordngly, the location of the light receiving element 9 on the optical axis should be determined in consideration of the degree of the cut of the light and the condensing power of the condenser such as a concave mirror, so as to obtain the desired illumination intensity at the surface 9a. The inverse incident rays 11 passed to the reflecting mirror 10 through the eyepiece lens 5, the pentaprism, the condenser lens 2 and the focusing plate 4 have little effect on the photometric accuracy since they scarcely reach the surface 9a of the light receiving element.

Figure 2A:
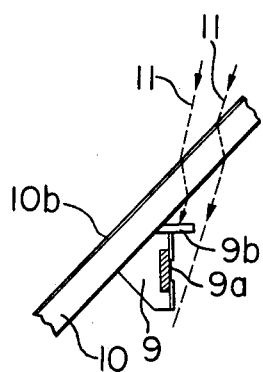
FIG. 2(A) is a diagrammatic illustration of a modified light receiving element.

Referring to FIG. 2(A), it will be seen that even when the light receiving element 9 is attached to the backside of the reflecting mirror 10,, the inverse incident rays 11 have little effect on the photometric accuracy because I provide a shield member 9b against such incident rays reaching the surface 9a.

Figure 2B:
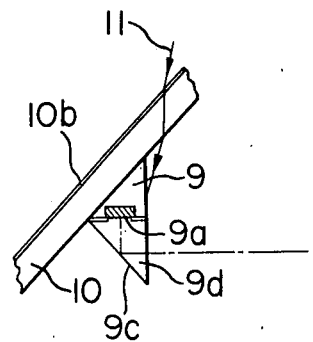
FIG. 2(B) is a diagrammatic illustration of another modified light receiving element.

Further, referring to FIG. 2(B), the light receiving element 9 may be attached to the backside of the reflecting mirror 10 in such a manner that the light receiving surface 9a is directed downwardly, and the prism 9d may be provided at the light receiving element so that the reflecting surface 9c of the prism can reflect the light from the reflecting-concentrating member 8 toward the light receiving surface 9a of the light receiving element. In this case, the disturbing effect of the inverse incident rays 11 is also reduced.

Figure 3:
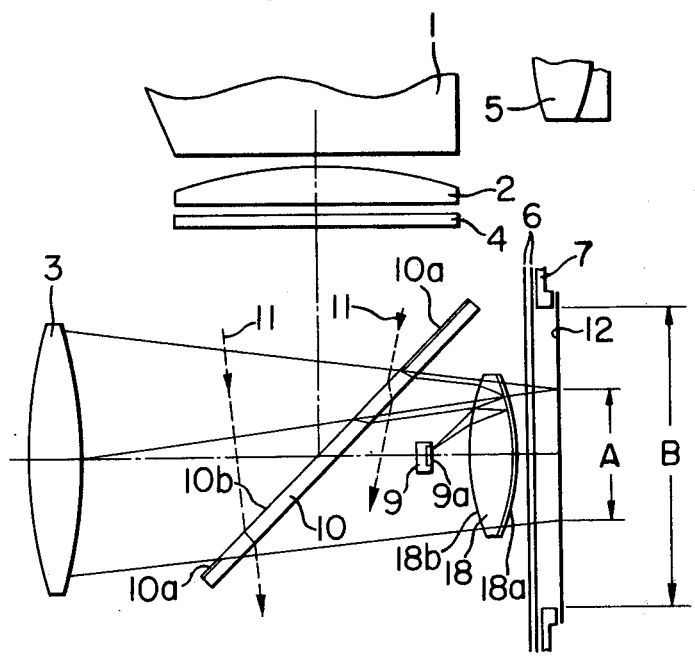
FIG. 3 is a diagrammatic illustration of the second embodiment of the present invention.

In the second embodiment of this invention shown in FIG. 3, a convex lens 18, one surface of which is made to reflect the light rays, is used as the reflecting-concentrating member. The back surface 18a of the convex lens 18 is used as a reflecting surface so that after the light rays passing through the reflecting mirror 10 enter pass the surface 18b of the lens 18, they are reflected by the reflecting surface 18a and then exit from the surface 18b to enter into the surface 9a of the light receiving element. This structure aims at the gentle radius curvature of the convex lens 18 and therefore permits the use of a thin convex lens.

Figure 4A:
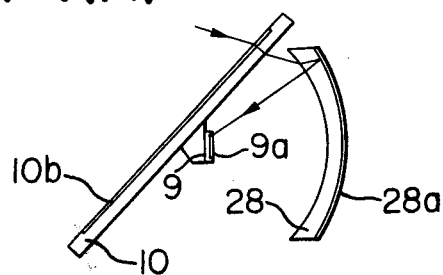
FIG. 4(A) and 4(B) are diagrammatic illustrations of the third embodiment of the present invention, FIG. 4(A) showing the arrangement of the elements when they are in the light path of the camera lens, and FIG. 4(B) showing the arrangement of the elements when they are out of the light path of the camera lens.

On the contrary, in the third embodiment of the present invention, as shown in FIG. 4, a concave lens 28 is used as a reflecting-concentrating member of which the surface 28a is made the reflecting surface. The back surface 28a of the concave lens 28 seen in FIG. 4(A) is designed to reflect the light rays, so that even if the reflecting surface 28a is a spherical one which may be easily machined, it is possible to focus the light rays at a point by the action of the concave lens 28.

Figure 4B:
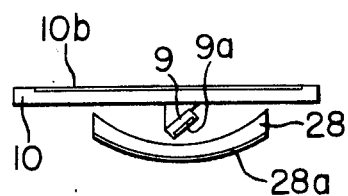

Further, in the embodiment, when the reflecting-concentrating member 28 and the reflecting mirror 10 are moved from the photographing light path, the light receiving element 9 can be disposed in the space formed by the concave surface of the concave lens 28 and the reflecting mirror 10 as shown in FIG. 4(B) efficiently to utilize the space.

From the foregoing description, it will be seen that, according to my invention, the reflecting-concentrating member, such as a concave mirror 8 or a convex lens 18 or concave lens 28, with a back surface mirror, is not angularly disposed but perpendicularly disposed with respect to the optical axis of the photo-taking lens 3, so that it is easy to secure the accuracy of the position of the reflecting-concentrating member and the member can be made compact and light in weight. Further, the location error or geometric error in manufacturing and assembly has no significant effect on the photometric measuring accuracy. It is also true that the effect of inverse incident light from the eyepiece is negligible.

I believe that the construction and utilization of my novel device will now be understood, and that the advantages thereof will be fully appreciated by those persons skilled in the art.

I claim:

1. A single lens reflex camera comprising:
an objective;
a view finder optical system;
beam splitting means for reflecting part of a light beam passing through said objective to said view finder optical system and for transmitting the remainder of the light beam;
a light reflecting and concentrating member of which the optical axis coincides substantially with that of said objective, said light reflecting and concentrating member being positioned behind said beam splitting means in the direction of travel of light beam transmitted through said beam splitting means; and
photoelectric converting means positioned between said beam splitting means and said light reflecting and concentrating member and substantially on the optical axis of said objective, the light receiving surface of said photoelectric converting means facing said light reflecting and concentrating member to receive the light beam reflected and concentrated by said reflecting and concentrating member.

2. A single lens reflex camera according to claim 1, wherein said light reflecting and concentrating member is positioned immediately in front of a focal plane shutter and is large enough to cover the photometric range of a phototaking picture.

3. A single lens reflex camera according to claim 1, wherein said light reflecting and concentrating member is a concave mirror (8).

4. A single lens reflex camera according to claim 1, wherein said light reflecting and concentrating member is a lens (18, 28) of which one surface is mirror-coated.

5. A single lens reflex camera according to claim 1, wherein said photoelectric converting means is fixed to said reflecting means, and further comprising a member fixed on said reflecting means to prevent inverse incident light rays, which are passed through said view finder and said reflecting means, from entering said photoelectric converting means.

6. A single lens reflex camera according to claim 1, wherein said photoelectric converting means is fixedly supported on said reflecting means.

* * * * *